United States Patent [19]

Shepherd

[11] 4,103,883
[45] Aug. 1, 1978

[54] ADJUSTABLE SUPPORTING STRUCTURE

[75] Inventor: Willard W. Shepherd, Whittier, Calif.

[73] Assignee: Shepherd Machinery Company, Los Angeles, Calif.

[21] Appl. No.: 833,155

[22] Filed: Sep. 14, 1977

[51] Int. Cl.² .............................................. B23Q 3/00
[52] U.S. Cl. ................................ 269/71; 214/1 QC; 269/289
[58] Field of Search ................. 269/71, 289; 254/133, 254/122, 124; 248/188.4, 188.6, 431; 5/116; 108/118, 137, 147; 214/1 QC, 1 P

[56] References Cited

U.S. PATENT DOCUMENTS

| 2,624,535 | 1/1953 | Bollhoefer | 254/124 |
|---|---|---|---|
| 3,182,614 | 5/1965 | McLean | 108/118 |
| 3,918,697 | 11/1975 | Gregory | 269/289 |

Primary Examiner—Robert C. Watson

Attorney, Agent, or Firm—Harris, Kern, Wallen & Tinsley

[57] ABSTRACT

An adjustable supporting structure for use as a universal engine repair stand, or for other purposes, including two X-shaped end frames each comprising frame members having upper and lower ends and each having means pivotally interconnecting the frame members thereof between their upper and lower ends, two spacing means respectively interconnecting the frame members of the end frames adjacent the lower ends of the frame members for varying the spacings of the upper ends of the frame members, laterally spaced rolls extending longitudinally between the end frames and rotatably mounted on the upper ends of the frame members, a flexible sheet extending between and having longitudinal edges connected to the respective rolls, and means for selectively rotating the rolls in directions such as to selectively wind the edges of the sheet on and unwind them from the rolls.

4 Claims, 9 Drawing Figures

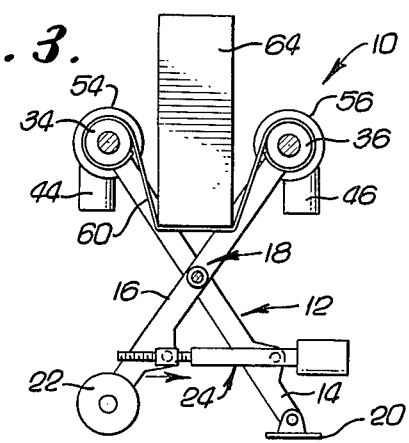
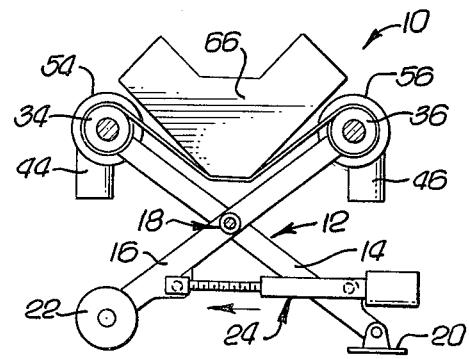
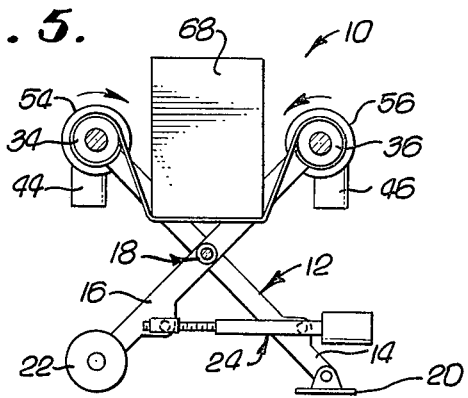
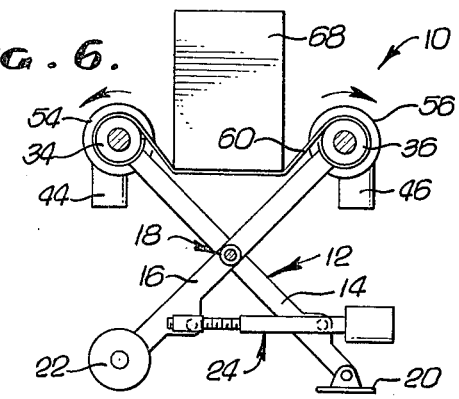
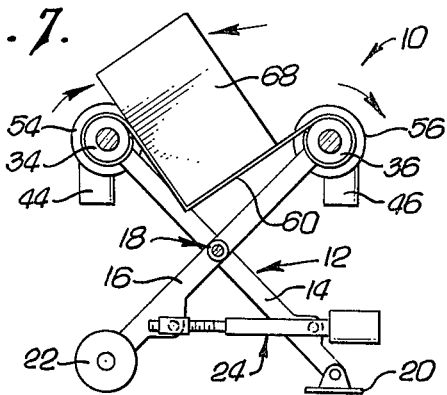
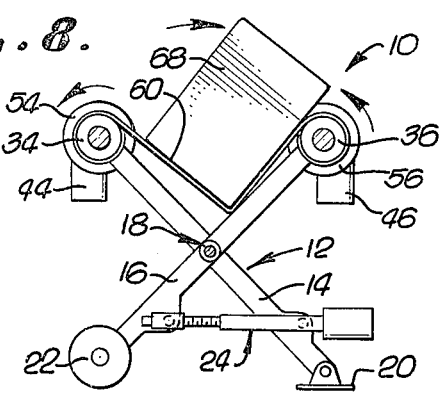
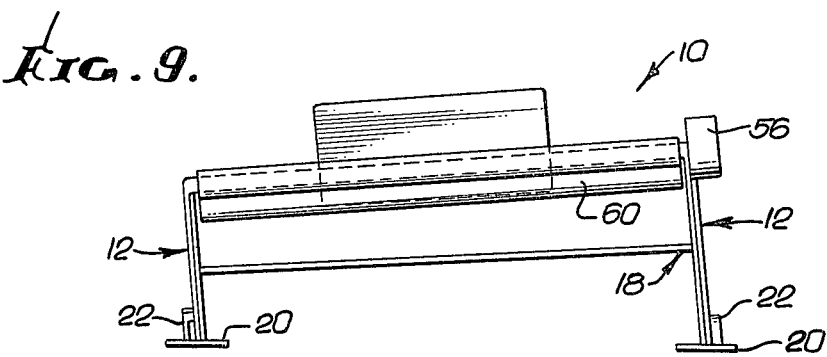

ADJUSTABLE SUPPORTING STRUCTURE

BACKGROUND OF THE INVENTION

The present invention relates in general to an adjustable supporting structure and, more particularly, to one which comprises adjustable flexible platform means capable of supporting heavy articles in different positions. Portions of the flexible platform means are carried by laterally spaced, longitudinal rolls the distance between which may be varied to vary the position in which a heavy article is supported.

An adjustable supporting structure of the foregoing general character is disclosed in Japanese Pat. No. 47-46421. More particularly, this patent discloses a slab turning device which includes two longitudinally spaced sets of flexible belts carried by laterally spaced, longitudinal rolls the distance between which may be varied to vary the position of the slab, the two sets of belts being driven by the rolls to turn the slab.

The present invention relates to an adjustable supporting structure of the foregoing general type, but one which can be used to support articles of different shapes and/or sizes in various positions so that any desired operations can be performed thereon. For example, the present invention may be utilized to support engines of different shapes and/or sizes in various positions for repair purposes, or the like, thereby providing a universal engine repair stand.

OBJECTS AND SUMMARY OF THE INVENTION

With the foregoing background in mind, a primary object of the invention is to provide an adjustable supporting structure of the general character indicated wherein the flexible platform means comprises simply a flexible sheet extending between and carried by the rolls and capable of supporting any desired engine, or other article, in any desired position without any necessity for connecting the article to the adjustable supporting structure.

In a sense, the invention contemplates, and a basic object of the invention is to provide, means for supporting the desired article in a hammock-like structure which can be adjusted to accommodate the shape and/or size of the article and to locate it in the desired position.

The invention may be summarized as including, and an important object is to provide an adjustable supporting structure which includes: two end frames each comprising frame members having upper ends and each having means pivotally mounting the frame members thereof below their upper ends; two spacing means respectively interconnecting the frame members of the end frames for varying the spacings of the upper ends of the frame members; laterally spaced rolls extending longitudinally between the end frames and rotatably mounted on upper ends of the frame members; a flexible sheet extending between and having portions carried by the rolls, respectively; and means for rotating the rolls.

The invention may be further summarized as including, and another important object is to provide an adjustable supporting structure which includes: two end frames each comprising frame members having upper ends and each having means pivotally interconnecting the frame members thereof below their upper ends; two spacing means respectively interconnecting the frame members of the end frames for varying the spacings of the upper ends of the frame members; laterally spaced rolls extending longitudinally between the end frames and rotatably mounted on the upper ends of the frame members; a flexible sheet extending between and having longitudinal edges connected to the rolls, respectively; and means for selectively rotating the rolls in directions such as to selectively wind the edges of the sheet on and unwind them from the rolls.

Another object is to provide a structure wherein each of the end frames is generally X shaped and wherein the frame members of each of the end frames have lower ends below the pivotal interconnections thereof.

Yet another object is to provide a structure wherein each of the spacing means interconnects the frame members of the corresponding end frame below the pivotal interconnection thereof.

The foregoing objects, advantages, features and results of the present invention, together with various other objects, advantages, features and results which will be evident to those skilled in the art in the light of this disclosure, may be achieved with the exemplary embodiment of the invention described in detail hereinafter and illustrated in the encompanying drawings.

DESCRIPTION OF DRAWINGS

FIGS. 3 and 9 are semidiagrammatic views illustrating different operative positions of the adjustable supporting structure of the invention.

DESCRIPTION OF EXEMPLARY EMBODIMENT OF INVENTION

Figure 1:
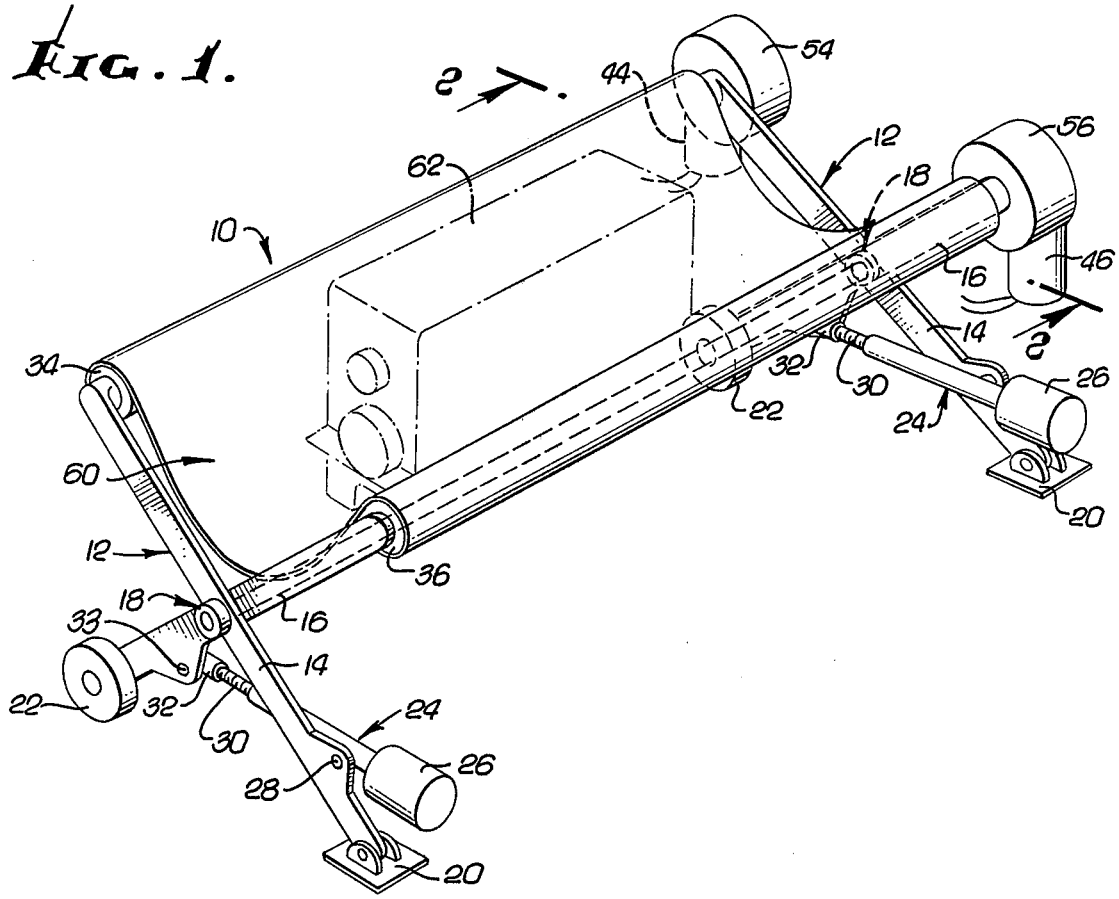
FIG. 1 is a perspective view of an adjustable supporting structure which embodies the invention.
Figure 2:
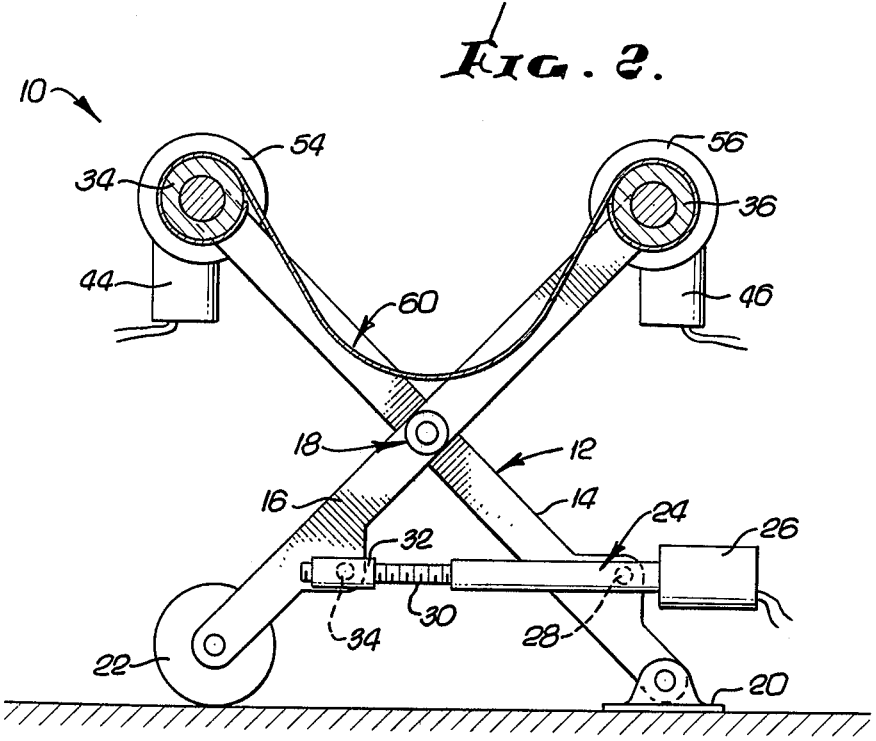
FIG. 2 is a transverse sectional view taken as indicated by the arrowed line 2—2 of FIG. 1.

Referring particularly to FIGS. 1 and 2 of the drawings, the adjustable supporting structure of the invention is designated generally by the numeral 10 and includes two longitudinally spaced, X-shaped end frames 12 each having frame members 14 and 16 pivotally interconnected intermediate their upper and lower ends by a pivot means 18 which extends from one of the end frames 12 to the other.

The frame member 14 of each end frame 12 is provided at its lower end with a pivoted supporting pad 20 and the frame member 16 of each end frame is provided at its lower end with a wheel 22. As will be apparent, the lower end of each frame member 16 can roll toward or away from the lower end of the corresponding frame member 14 as the latter pivots, thereby decreasing or increasing the spacing of the upper ends of the frame members 14 and 16 of the corresponding end frame 12. The spacings of the upper ends of the frame members 14 and 16 of the end frames 12 can be varied in unison, or independently.

Two independent spacing means 24 selectively control the spacings of the upper ends of the two sets of frame members 14 and 16. Each spacing means 24 is shown as comprising an electric screw actuator 26 pivotally connected to the corresponding frame member 14 adjacent its lower end, at 28, and driving a screw 30 threaded into a nut 32 pivotally connected to the corresponding frame member 16 adjacent its lower end, at 33.

The supporting structure 10 also includes two laterally spaced rolls 34 and 36 extending between the end frames 12, the roll 34 being rotatably mounted on the upper ends of the frame members 14 and the roll 36 being rotatably mounted on the upper ends of the frame members 16. Self-aligning bearings, not specifically shown, are utilized to rotatably mount the rolls 34 and 36 on the upper ends of the respective frame members 14 and 16 to permit varying the spacings of the ends of the rolls 34 and 36 independently of each other. Thus, the rolls 34 and 36 may be parallel, or skewed.

The rolls 34 and 36 are independently driven in either direction by electric motors 44 and 46, respectively, through speed reducers 54 and 56, respectively. The speed reducers 54 and 56 are respectively connected to the rolls 34 and 36 through self-aligning couplings which are not specifically shown and which permit independently adjusting the spacings of opposite ends of the rolls 34 and 36.

A flexible sheet 60, capable of supporting an engine 62, or other heavy article, extends between the rolls 34 and 36 and has longitudinal edges which are connected to the respective rolls 34 and 36 in any suitable manner. The flexible sheet 60, which is relatively thick, e.g., ⅛, and may be formed of a suitable plastic, or any other appropriate material, constitutes a hammocklike, flexible platform means for the engine 62, or other heavy article. An important advantage of the invention is that the engine 62, or other article, is supported by the flexible sheet 60 without any necessity for attaching the engine in any way.

FIGS. 3 to 9 illustrate the universality with which the supporting structure 10 of the invention may be used as an engine repair stand.

For example, FIG. 3 illustrates how the supporting structure 10 can be used to support a narrow engine 64 by decreasing the spacing between the rolls 34 and 36.

FIG. 4 shows the spacing of the rolls 34 and 36 increased to support a wide engine 66.

FIG. 5 shows how an engine 68 can be lowered by rotating the rolls 34 and 36 in directions to unwind the longitudinal edges of the flexible sheet 60 therefrom. Conversely, FIG. 6 shows how the engine 68 can be raised by winding the longitudinal edges of the flexible sheet 60 on the rolls 34 and 36.

FIG. 7 illustrates how the engine 68 can be tilted to the left by rotating the rolls 34 and 36 clockwise so that the flexible sheet is unwound from one and wound on the other. FIG. 8 shows how rotating the rolls 34 and 36 counterclockwise will tilt the engine 68 to the right. In either case, the engine 68 can be rolled over completely by reeling in the sheet 60 on one side and releasing it on the other.

In FIGS. 3 to 8, the rolls 34 and 36 are maintained parallel, or substantially parallel, by operating the two spacing means 24 in unison.

In FIG. 9, the spacing of the upper ends of the frame members 14 and 16 of the left end frame 12 exceeds the spacing of the upper ends of the frame members of the right end frame, whereby the entire supporting structure 10 is tilted longitudinally to the left. (It could just as well be tilted longitudinally to the right by reversing the foregoing.) This feature of differentially spreading the end frames 12 provides for drainage from either end, or for leveling an asymetrical engine, or other article.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. In an adjustable supporting structure, the combination of:
    (a) two end frames each comprising frame members having upper ends and each having means pivotally mounting said frame members thereof below their upper ends;
    (b) two adjustable-length spacing means respectively having ends connected to said frame members of said end frames, respectively, for varying the spacings of said upper ends of said frame members;
    (c) laterally spaced rolls extending longitudinally between said end frames and rotatably mounted on said upper ends of said frame members;
    (d) a flexible sheet extending between and having portions carried by said rolls, respectively; and
    (e) means for rotating said rolls.

2. In an adjustable supporting structure, the combination of:
    (a) two end frames each comprising frame members having upper ends and each having means pivotally interconnecting said frame members thereof below their upper ends;
    (b) two spacing means respectively interconnecting said frame members of said end frames for varying the spacings of said upper ends of said frame members;
    (c) laterally spaced rolls extending longitudinally between said end frames and rotatably mounted on said upper ends of said frame members;
    (d) a flexible sheet extending between and having longitudinal edges connected to said rolls, respectively; and
    (e) means for selectively rotating said rolls in directions such as to selectively wind said edges of said sheet on and unwind them from said rolls.

3. An adjustable supporting structure according to claim 2 wherein each of said end frames is generally X shaped and wherein said frame members of each of said end frames have lower ends below the pivotal interconnections thereof.

4. An adjustable supporting structure as defined in claim 3 wherein each of said spacing means interconnects said frame members of the corresponding end frame below said pivotal interconnection thereof.

* * * * *